US 6,662,648 B2

(12) United States Patent
Fehrenbach et al.

(10) Patent No.: US 6,662,648 B2
(45) Date of Patent: Dec. 16, 2003

(54) FILLING LEVEL MEASURING DEVICE

(75) Inventors: Josef Fehrenbach, Haslach (DE); Karl Griessbaum, Muehlenbach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 09/930,180

(22) Filed: Aug. 16, 2001

(65) Prior Publication Data

US 2002/0026828 A1 Mar. 7, 2002

Related U.S. Application Data

(60) Provisional application No. 60/273,338, filed on Mar. 6, 2001.

(30) Foreign Application Priority Data

Sep. 6, 2000 (DE) .......................... 100 43 838

(51) Int. Cl.$^7$ ............................... G01F 23/28
(52) U.S. Cl. ................ 73/290 V; 73/290 R; 73/629; 73/304 R
(58) Field of Search .................. 73/290 R, 290 V, 73/629, 304 R, 622

(56) References Cited

U.S. PATENT DOCUMENTS 3,695,107 A   10/1972  Hertz et al. ............... 73/290 R
3,853,005 A * 12/1974  Schendel .................. 73/290 R
5,137,991 A *  8/1992  Epstein et al. ............. 525/540
5,568,449 A * 10/1996  Rountree et al. ............ 367/99

FOREIGN PATENT DOCUMENTS

DE    27 43 341         4/1979
DE    38 87 415         7/1994
DE   198 20 839     * 11/1999   ......... G01F/23/284
EP     0 042 186        12/1981

* cited by examiner

*Primary Examiner*—Hezron Williams
*Assistant Examiner*—Rodney Frank
(74) *Attorney, Agent, or Firm*—Nath & Associates PLLC; Marvin C. Berkowitz

(57) ABSTRACT

A filling level measuring device with a transmitting and receiving device (1) and a waveguide (6, 7), one end of which (6a, 7a) is coupled to the transmitting and receiving device (1) and the other end of which (6b, 7b) is immersed in a filling material (11), to which waveguide (6, 7) electromagnetic waves from the transmitting and receiving device (1) can be conducted, while electromagnetic waves reflected in the waveguide (6, 7) can be used in the transmitting and receiving device (1) for measuring the filling level, and the other end (6b, 7b, 28b) exhibits a wave absorption device (26, 27, 29, 17, 18, 22) for at least partial absorption of the conducted electromagnetic waves.

8 Claims, 2 Drawing Sheets

FILLING LEVEL MEASURING DEVICE

Figures 1, 1A, 1B:
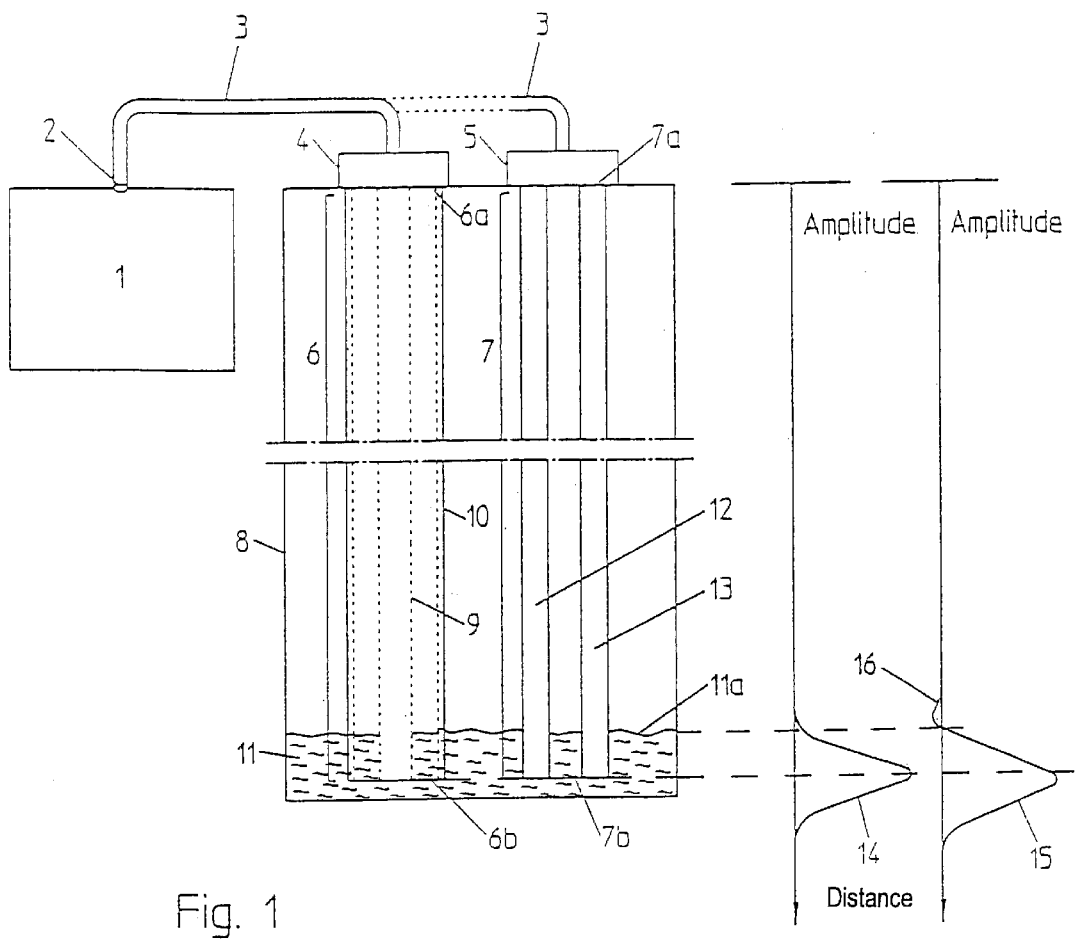

This application claims the benefit of provisional application No. 60/273,338 filed Mar. 6, 2001.

The invention relates to a device for measuring filling levels, particularly for determining the filling height of a filling material in a container.

Measurement of the filling level in general involves the use of measuring systems that determine the distance between a sensor and the filling material on the basis of the measured transit time of electromagnetic waves traveling from a sensor mounted in the container lid to the surface of the filling material and back. The filling level can then be calculated from a knowledge of the container height.

Sensors of this type are known under the technical designation of filling level radar and are based overall on the property of allowing electromagnetic waves to propagate within a homogenous, non-conductive medium at a constant speed and to be reflected at least partially at the border area of different media. Every border layer between two media with different dielectric constants produces a radar echo upon impact of the wave. The greater the difference in the two dielectric constants, the greater the change in the wave resistance of wave propagation and the greater the observed echo.

Different radar methods are known for determining the wave transit time. The two primary methods are the pulse transit time method (pulse radar method) and the frequency-modulated continuous wave radar method=FMCW radar method). The pulse radar process makes use of pulsing amplitude-modulation of the transmitted wave and determines the direct period of time between transmission and reception of the pulses. In the FMCW radar process the transit time is determined indirectly by transmitting a frequency-modulated signal and determining the difference between the transmitted and the received momentary frequency. Other process are described, e.g., in DE 44 04 745 C2.

In addition to the different radar principles, various frequency ranges of the electromagnetic waves are used, depending on the application. For example, there are pulse radars with carrier frequencies in the range from 5 and 30 GHz, as well as some which work in the base band as so-called monopulse radars without a carrier frequency. Also known is a series of different methods which guide the electromagnetic wave to the surface of the filling material and back.

A fundamental distinction is made between waves emitted into space and waves that are guided by a conductor. Radar sensors which guide the electromagnetic wave to the reflecting point and back by means of wiring are often referred to as TDR (time domain reflectometry; in German, direct current pulse reflectometry) sensors. As compared to sensors which freely radiate high-frequency waves, these sensors exhibit a considerably lower attenuation in the reflected echo signal, since the power flow occurs only in a narrowly limited range in the area around the conductive waveguide. Furthermore, spurious echoes from the inside of the container are largely avoided with sensors of this kind. Such spurious echoes can arise from reflections of the wave on components installed in the container (e.g., stirring devices, tubes, etc.), and in the case of freely radiating sensors they can make it more difficult to identify an echo signal. As a result, level measurement that is performed with conducted electromagnetic waves is largely independent of the container construction and also of the product characteristics of the filling material and of other operating conditions (e.g., dust, angle of bulk material, etc.), and thus provides very reliable measuring results.

Suitable as a waveguide for conducting the wave is any high-frequency electrical line in which the wave at least partially penetrates the medium that the metallic conductor surrounds or that is enclosed by said metallic conductor. Specifically, parallel-wire lines, single-wire lines, coaxial lines, and high-frequency waveguides have proven to be particularly suitable in this connection. The metal parts used here for the sensors can either be produced from corrosion-proof steel or provided with an insulating layer for protection against aggressive filling materials. A level sensor with a guided wave is described by way of example in DE 44 04 745 C2.

The measuring range of a sensor is generally limited by the length of the waveguide, which is usually referred to as a probe in devices of this kind for determining the level of filling material. Since, as a rule, the electric transmitting and receiving device is mounted in the container lid, the probe runs downward from the mount opening in the lid and ends above the container floor. To also allow filling levels to be measured when the container is only slightly full, it is expedient for the probe to end as close to the container floor as possible. If, when the container is only slightly full, the end of the probe is immersed just a few centimeters into the filling material, the result—as expected—is a reflection at the border area of the filling material; but since this reflection is not a total reflection of the entire wave, a larger or smaller portion of the wave will penetrate the filling material, depending on the size of the dielectric constants of the filling material. This penetrating portion meets the end of the probe, which usually represents an electrical open circuit. On the other hand, there is an electrical short circuit in the case of a likewise only partially used, uninsulated dead-ending of the probe against the container floor (a cable probe may be mentioned here by way of example). In both cases the probe end totally reflects the arriving wave. An additional echo is thereby produced.

The pulse width of an echo is dependent on the modulation bandwidth of the modulated transmission signal. In pulse radar, for example, this is dependent on the pulse width of the transmitted pulse. In the case of a container that is only slightly filled, if echoes are produced from two closely neighboring reflection points (for example, from the probe end and from the surface of the filling material), these echoes may partly overlap in time. For customary pulse widths of about 10 to 30 cm, which correspond to modulation bandwidths of about 0.75 to 1.75 GH, the two echoes overlap until the end of the probe is immersed in the filling material by an amount that corresponds to the pulse width. In the evaluation process it is difficult to separate these overlapping echo portions from reflections at the surface of the filling material and reflections at the end of the probe, and a problem arises in that the sought-after position of the filling material cannot be precisely determined.

When the filling level is low the evaluation of the echo is difficult and an exact determination of the filling level is almost impossible, particularly in the case of filling materials for which the dielectric constant exhibits lower values and for which, therefore, the amplitude of the filling material echo is small as compared to the amplitude of the echo from the probe end.

Known from EP 0 780 665 A2 is a filling level sensor for which spurious echoes for an empty container are measured and stored. Spurious echoes are eliminated by subtracting the empty signal from the actually measured echo signal. However, this method is not suitable for eliminating the influence of the spurious echoes from the probe end, since at the beginning of the filling this echo changes in its temporal sequence relative to the echo of the filling level surface due to the reduced propagation speed of the wave within the filling material, and is furthermore reduced in amplitude by dampening within the filling material. The elimination of an unwanted signal by means of subtraction is only successful when an exact assignment according to time and amplitude is possible, and this is ruled out in the case of spurious echoes from the end of the probe, for the indicated reasons.

The goal of the present invention is to propose a filling level measuring device that correctly measures filling levels even at a low level of fill or at a slight immersion depth on the part of the waveguide.

This goal is solved by a filling level device having a waveguide having a wave absorption device for at least partial absorption of the conducted electromagnetic waves. Advantageous embodiments and elaborations of the invention are also described.

The basic idea of the invention consists in providing the end that is immersed in the filling material with a wave absorption device which at least partly absorbs the introduced electromagnetic waves. This assures that an electromagnetic wave running to the end of the probe can only be reflected to a limited degree at this point, thus providing an effective reduction in spurious echoes.

The type of wave-absorption device depends on the type of design and construction of the waveguide (probe) itself, as the following exemplary embodiments will make clear.

In all conventional probes—particularly single-wire, double-wire, coaxial, and waveguide probes—absorption can be provided by applying a wave-dampening material to the end of the probe. In high-frequency technology, various materials are available to achieve this end, materials which can be selected according to the different frequency ranges and the required degrees of dampening.

As a preferred embodiment, reference is made to a material that has a fine distribution of conductive pigments within a filling material.

Devices of this kind can be easily produced. It is only necessary to assure that a corresponding body formed from this material can be applied to the end of the waveguide. The design is not restricted in advance and can be determined by criteria such as ease of production and/or mechanical expediency.

It proved to be particularly advantageous to use carbon black particles as conductive pigments. Pigments of this kind are attractive in terms of cost and are available in practically any desired thickness and size.

Silicon is employed as the preferred filling material, since it can also be cheaply obtained and permits any desired shape. Furthermore, it is inert as compared to a number of liquids that come into consideration as filling materials.

In a particularly advantageous embodiment of the invention, the wave-dampening material is designed as a cone-shaped body. This assures that the dampening effect increases or decreases over the exact position on the end of the waveguide.

Another embodiment of the invention provides that the wave-dampening material exhibits a dampening gradient. This is achieved by selecting a shape in accordance with the desired dampening behavior and by choosing the concentration of the pigments in the filling material accordingly, or by using pigments of differing conductivity.

In the case of two-wire and coaxial probes it is possible as an alternative to insert an ohmic resistor between the two ends of the line, at the probe end. For this ohmic resistor it is preferable to select a resistance value that lies in the vicinity of the wave resistance of the probe (waveguide).

It is particularly advantageous to choose a resistance value that is somewhat smaller than the resistance possessed by the probe when it has not yet been immersed in the filling material. This guarantees that when the container is completely empty a small, usable echo arises at the probe end—an echo that can be used for displaying the empty status of the container. If the probe end is immersed in the filling material, the wave resistance of the immersed portion of the probe is reduced, due to the dielectric constants of the filling material. An ideal selection of the terminal resistor will assure that this resistance coincides with the wave resistance of the immersed probe, and the wave will be completely absorbed.

As a terminating resistor, it is advantageous to have an SMD resistor that exhibits low inductance and is capable of high-frequency operation. Resistor wires or wired resistors are also possible.

Figures 2, 2A, 2B:
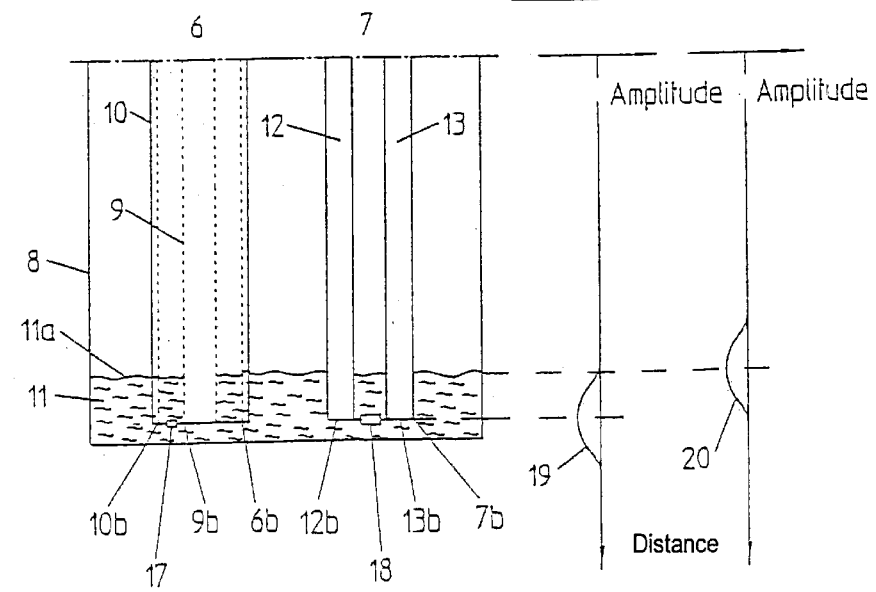

The filling level measuring device according to the invention will next be described in greater detail on the basis of preferred exemplary embodiments. Shown are:

FIG. 1 a level measuring device with a coaxial probe according to the prior art and a level measuring device with a two-wire probe according to the prior art FIG. 1a an echo signal profile for operation of the level measuring devices shown in FIG. 1 with an empty container FIG. 1b an echo signal profile for operation of the level measuring devices shown in FIG. 1 with a slightly filled container FIG. 2 level measuring devices according to FIG. 1 with wave absorption devices (level measuring devices according to the invention)

Figures 3, 4:
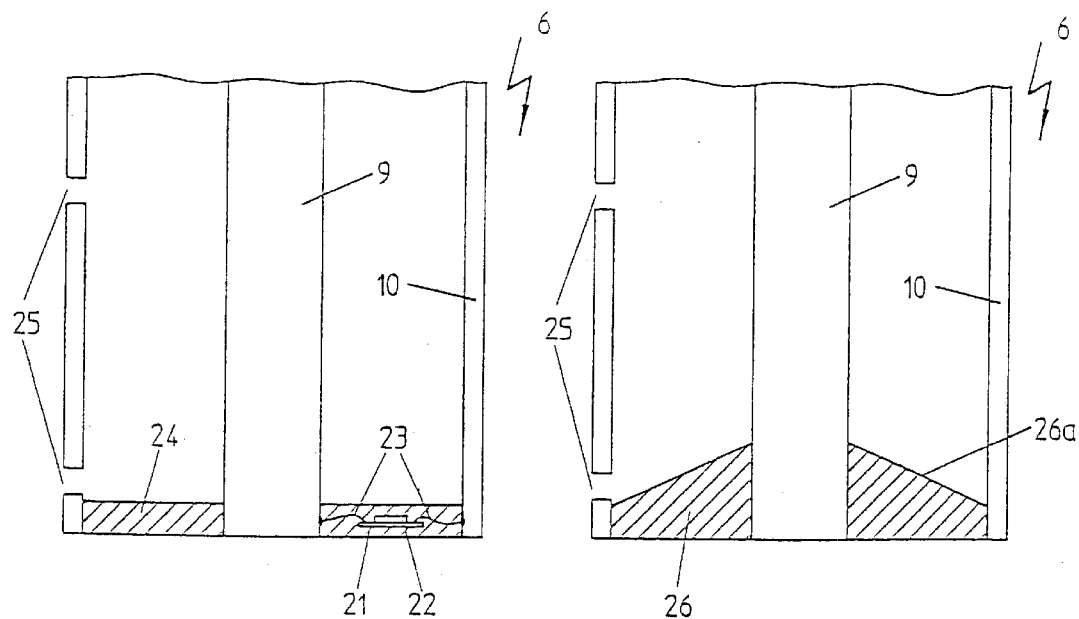
Figures 5, 6:
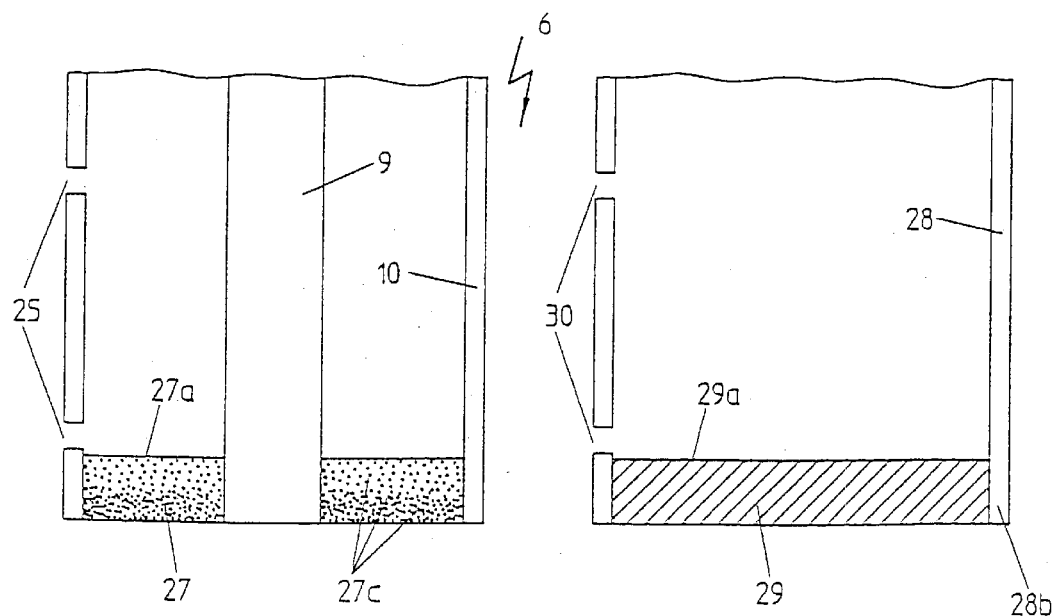

FIG. 2a an echo signal profile for operation of the level measuring devices with wave absorption devices according to FIG. 2 with an empty container FIG. 2b an echo signal profile for operation of the inventive level measuring devices according to the FIG. 2 with a slightly filled container FIG. 3 an exemplary embodiment of an inventive level measuring device with a coaxial probe, with a built-in terminal resistor FIG. 4 an exemplary embodiment of an inventive level measuring device with a coaxial probe, with cone-shaped dampening material as a wave absorption device FIG. 5 an exemplary embodiment of an inventive level measuring device with a coaxial probe, where a dampening material whose dampening effect increases gradually is used as a wave absorption device FIG. 6 an example of a waveguide probe with a body consisting of dampening material at the probe terminal The level measuring devices according to the prior art that are depicted in FIG. 1 exhibit a transmitting and receiving device 1 with an outlet 2, which is connected, for example, by a coaxial cable 3 to a transition element 4 (or 5) which couples the transmitting and receiving signal, in ingoing and outgoing fashion, to a corresponding waveguide (probe) 6 (or 7). The waveguide 6 (or 7) is installed in a container of filling material.

Two possible probe designs are briefly described by way of example:

Depicted on the left side of FIG. 1 is a coaxial probe 6 consisting of a rod-shaped inner conductor 9 and a tube-shaped outer conductor 10. If the container for the filling material is filled with a liquid substance 11, the coaxial probe 6 is immersed in this liquid 11, as schematically depicted in FIG. 1. In the process, the liquid filling material 11 fills the intermediate space between the inner and outer conductors 9 and 10.

Depicted on the right side of FIG. 1 is a two-wire probe 7 consisting of two individual wires 12 and 13 positioned at a defined distance from each other.

In their non-immersed state both probes 6 and 7 exhibit a wave resistance $Z_{air}$, which depends on the design of the given probe 6 or 7 and which usually lies between 50 Ω and 300 Ω. For probes 6, 7 immersed in the filling material, the wave resistance Z of the immersed section drops by the reciprocal of the square root of the dielectric constants $\epsilon_{r,\ filling\ material}$ of the filling material 11.

In the current art, the probe ends 6b and 7b are operated in both cases in open circuit mode. When the transmitting and receiving device 1 operates according to the pulse transit time method and transmits very short, positive direct-current pulses, the results are echo signal profiles dependent on the filling level, as depicted by way of example in FIGS. 1a and 1b. The polarity of the received echo pulses depends on whether the wave resistance Z at the reflection point changes to a lower or a higher value. For change to a lower value the polarity of the pulse is reversed; for change to a higher value it is not. The amplitude of the echo pulse depends on the change in the wave resistance at the reflected point; here a large change induces a large amplitude in the echo signal.

The echo signal profile shown in FIG. 1a is the result of a completely empty container. The echo signal 14 of the open-circuit probe end 6b, 7b shows a positive polarity. The pulse width of the echo signal 14 is, e.g., 15 cm, and this value corresponds to the width of the echo signal 14 at half the maximum amplitude.

When the container is slightly full, as indicated in FIG. 1 by the filling material surface 11a, the result is an echo signal profile like that shown in FIG. 1b. Shown is an echo signal 15 at a reflection on the probe end 6b, 7b, that is dampened by the filling material 11 in comparison with the echo signal 14 and is slightly delayed due to the reduced propagation speed in the filling material 11. Additionally superimposed, furthermore, is an echo signal 16 of low amplitude, which stems from the reflection of an incoming electromagnetic wave on the filling material surface 11a. Determining and evaluating this echo signal 16 is possible only imprecisely, if at all.

Filling level measuring devices according to the invention are depicted in FIG. 2. The section shown in FIG. 2 is limited to the parts of the devices which differ from the filling level measuring devices according to the prior art shown in FIG. 1.

The initially described open-circuit probe ends 6b, 7b are sealed in the invention by ohmic resistors 17 and 18, which are positioned between the given conductor ends 9b, 10b, or 12b, 13b of the two conductors 9 and 10 or 12 and 13.

The dimensions of the resistors 17 and 18 are designed according to the following criteria.

Ideally the value R of the terminal resistors 17, 18 will be identical to the wave resistance Z of the immersed probes 6 or 7. This value Z depends, however, on the dielectric constants $\epsilon_{r,\ filling\ material}$ of the filling material 11, i.e., it is different for each application. In choosing the resistance value R, a good compromise is achieved if filling materials 11 with low dielectric constants $\epsilon_{r,\ filling\ material}$ in the range from about 1.8 to 2.8 are taken as a point of reference. For these materials, the disruptive effect of the echo from the probe end is particularly pronounced, due to the low dampening of the wave inside the filling material 11. For resistance value R, therefore, the result is the wave resistance $Z_{air}$ of the probe 6, 7 in air multiplied by the inverse value of the square root of the dielectric constants $\epsilon_{r,\ filling\ material}$:

$$R = Z_{air} * (0.6\ldots0.75) \tag{1}$$

For example, if a coaxial probe 6 with a wave resistance $Z_{air}$=50 Ω is used, a terminal resistance 17 with a value of R=30 Ω to R=38 Ω recommends itself.

The corresponding reception signal profile of the probes 6, 7 shown in FIG. 2 is depicted in FIGS. 2a and 2b. FIG. 2a shows an echo signal profile 19 for an empty container 8. It is advantageous in this case that the probe end 6b, 7b produces a small echo signal 19, so that the transmitting and receiving device 1 is able to identify the empty state of the container 8. If no echo were present, this state would not differ, e.g., from a possible error state in the sensor.

FIG. 2b shows the echo signal profile for a low degree of fill in the container 8 with filling material 11, as shown in FIG. 2. An echo signal for the probe end 6b, 7b can no longer be detected, since the immersed part of the probe 6, 7 is sealed with a terminal resistor 17, 18, whose value R corresponds to the wave resistance Z. There remains the echo signal 20 from the filling material surface 1a; it is small but undisrupted, and its position can therefore be precisely determined.

In the example of a coaxial probe depicted in section, FIG. 3 shows how this kind of terminal resistor can be applied to a probe end 6b. Connected to the ends of the metallically conductive inner conductor 9 and the outer conductor 10 by means of lines 23 is an SMD resistor 22 (SMD=surface mounted device) soldered onto a small plate 21. To mechanically protect the structure, the area of the probe end 6b is filled to a height of several millimeters with insulating sealing compound 24. Equalizing holes 25 in the outer conductor 10 make it possible for the filling material 11 inside and outside of the probe 6 to occupy the same level.

FIGS. 4 and 5 show in section the ends of two coaxial probes 6 which exhibit wave absorption devices consisting of layers of intensive wave-dampening material 26, 27. To better accommodate the incoming wave the wave-dampening material 26 in FIG. 4 is formed as a conical body 26a around the inner conductor 9. The wave absorption device shown in FIG. 5 is designed as a cylindrical body 27a connecting the inner conductors 9 and the outer conductor 10. The cylindrical body 27a consists of wave-dampening material 27 which, also to accommodate the wave, exhibits a gradient with respect to the concentration of dampening pigments 27 distributed within it. The concentration of the dampening pigments 27c increases in the direction of the conductor ends 9b, 10b.

FIG. 6 shows in section the end 28b of a round waveguide probe 28. To absorb the waveguide wave the end 28b is filled with wave-dampening material 29. Here also the equalizing holes 30 in the walls of the waveguide 28 assure that the filling material 11 can get inside the waveguide 28.

The present invention is not limited to the examples just discussed, but can be applied generally to all possible types of waveguides for use in conducting electromagnetic waves.

List of Reference Symbols 1 transmitting and receiving device
2 outlet
3 coaxial cable
4 transitional element
5 transitional element
6 coaxial probe
6a one end 6b other end
7 two-wire probe
7a one end
7b other end
8 container of filling material
9 inner conductor
9b other end of inner conductor
10 outer conductor
10b other end of outer conductor
11 filling material
11a surface of filling material
12 first single wire
12b other end of first single wire
13 second single wire
13b other end of second single wire
14 echo signal of open-circuit probe end
15 echo signal of probe end
16 echo signal of filling material surface
17 ohmic resistor
18 ohmic resistor
19 echo signal of probe end
20 echo signal of filling material surface
21 plate
22 SMD resistor
23 conductors
24 sealing compound
25 equalizing hole
26 wave-dampening material
26a conical body
27 wave-dampening material
27a cylindrical body
27b pigment
28 hollow guide probe
28b end of hollow guide probe
29 wave dampening material
29a cylindrical body
30 equalizing opening
$\epsilon_{r,\ filling\ material}$ dielectric constant of filling material
R resistance value
Z wave resistance
$Z_{air}$ wave resistance without filling

What is claimed is:

1. A filling level measuring device with a transmitting and receiving device and a waveguide, one end of which is coupled to the transmitting and receiving device and an other end of which is immersed in a filling material, to which waveguide electromagnetic waves from the transmitting and receiving device can be conducted, while electromagnetic waves reflected in the waveguide can be used in the transmitting and receiving device for measuring the filling level, wherein the other end exhibits a wave absorption device for at least partial absorption of the conducted electromagnetic waves; and wherein the waveguide is a single-wire, a double-wire, a coaxial, or a hollow guide probe and the wave absorption device is a body that is positioned on the other end and consists of wave-damping material that is inert with respect to the filling material and that exhibits a dampening gradient that increases towards that end of the waveguide immersed in the filling material.

2. A filling level measuring device according to claim 1, wherein the wave-dampening material is a mixture of conductive pigments embedded in an insulating filling material.

3. A filling level measuring device according to claim 2, wherein the conductive pigments are carbon black pigments.

4. A filling level measuring device according to claim 2, wherein the filling material is silicon.

5. A filling level measuring device according to claim 1, wherein the wave-dampening material on the conductor end forms a cylindrical or conical body.

6. A filling level measuring device with a transmitting and receiving device and a waveguide, one end of which is coupled to the transmitting and receiving device and an other end of which is immersed in a filling material, to which waveguide electromagnetic waves from the transmitting and receiving device can be conducted, while electromagnetic waves reflected in the waveguide can be used in the transmitting and receiving device for measuring the filling level, wherein the other end exhibits a wave absorption device for at least partial absorption of the conducted electromagnetic waves;

wherein the waveguide is a two-wire or coaxial probe and the wave absorption device essentially consists of an ohmic resistor positioned between the two conductor ends of the probe ends; and wherein the resistance value of the ohmic resistor at least approximately corresponds to the wave resistance of a portion of the waveguide immersed in the filling material, and at least approximately corresponds to 0.6 to 0.75 times the wave resistance of a portion of the waveguide not immersed in the filling material.

7. A filling level measuring device according to claim 6, wherein the ohmic resistor is an SMD resistor.

8. A filling level measuring device according to claims 6, wherein the ohmic resistor is embedded in a sealing compound.

* * * * *